United States Patent [19]

Lentz

[11] Patent Number: 5,561,750
[45] Date of Patent: Oct. 1, 1996

[54] Z-BUFFER TAG MEMORY ORGANIZATION

[75] Inventor: Derek J. Lentz, Los Gatos, Calif.

[73] Assignee: Seiko Epson Corporation, Tokyo, Japan

[21] Appl. No.: 310,821

[22] Filed: Sep. 22, 1994

[51] Int. Cl.$^6$ ................................................ G06T 15/40
[52] U.S. Cl. ............................. 395/122; 395/164
[58] Field of Search .................... 395/122, 162, 395/164

[56] References Cited

U.S. PATENT DOCUMENTS

| | | | |
|---|---|---|---|
| 4,857,901 | 8/1989 | Lathrop | 345/188 |
| 4,924,415 | 5/1990 | Winser | 395/122 |
| 4,951,232 | 8/1990 | Hannah | 395/122 |
| 4,961,153 | 10/1990 | Fredrickson et al. | 395/122 |
| 5,005,117 | 4/1991 | Ikumi | 395/122 |
| 5,038,297 | 8/1991 | Hannah | 395/164 |
| 5,249,264 | 9/1993 | Matsumoto | 395/122 X |
| 5,265,199 | 11/1993 | Catlin | 395/122 |
| 5,266,941 | 11/1993 | Akeley et al. | 345/201 |
| 5,274,760 | 12/1993 | Schneider | 395/162 |
| 5,301,263 | 4/1994 | Dowdell | 395/122 |
| 5,388,205 | 2/1995 | Cantor et al. | 395/162 |
| 5,402,532 | 3/1995 | Epstein et al. | 395/122 |
| 5,416,893 | 5/1995 | Herrell et al. | 395/122 |

*Primary Examiner*—Mark K. Zimmerman
*Attorney, Agent, or Firm*—Eric B. Janofsky

[57] ABSTRACT

A method and system are provided for clearing portions of a Z-buffer in a computer controlled imaging system having an array of pixels, a graphics controller, a frame buffer and a Z-buffer. Invalidity bits (Z-tags) are established for each Z-buffer element in the Z-buffer and determine a valid or invalid state for the corresponding Z-buffer element. The invalidity bits are provided in the Z-buffer and are organized so that each invalidity bit is located on the same page as the corresponding Z-buffer element. Binary information is written into the invalidity bits so as to invalidate portions of the Z-buffer to be cleared. Additionally, accessing of the invalidity bits may be selectively discontinued so as to limit memory use when desired.

20 Claims, 7 Drawing Sheets

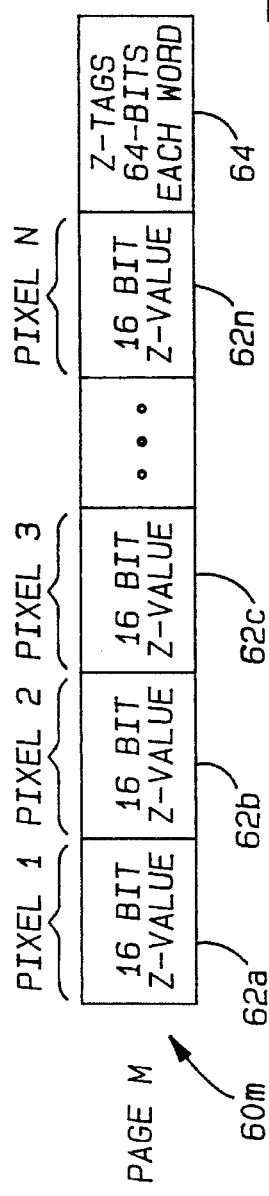
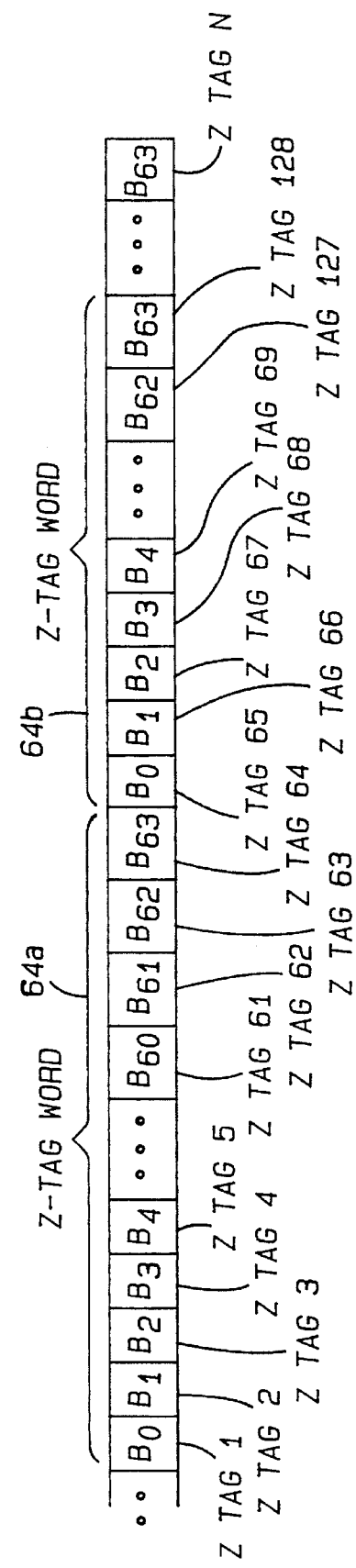
Fig-6
Fig-7

Z-BUFFER TAG MEMORY ORGANIZATION

BACKGROUND OF THE INVENTION

1. Technical Field:

This invention relates generally to a video display system for presenting representations of three-dimensional objects and, more particularly, to an improved method and apparatus for clearing a Z-buffer in a computer controlled video display system.

2. Discussion:

Computer controlled graphics or video display systems are commonly employed to display images of three-dimensional objects for viewing by an observer. As is commonly known, a video display system has a plurality of pixels arranged in a two-dimensional array of pixel locations on the graphics display, each pixel having an X and Y coordinate. A frame buffer and a separate Z-buffer are provided, each of which includes a plurality of memory locations that are mapped to the plurality of pixel locations. The frame buffer is typically a random access memory (RAM) often implemented with video random access memory (VRAM) and stores information about each pixel location which includes a digital representation of color and intensity for each pixel in an image. This pixel information in each frame is written to the frame buffer in order to produce the individual images or frames which are displayed one after another.

The Z-buffer uses a random access memory (RAM) which is typically implemented using dynamic random access memory (DRAM). The Z-buffer contains information which indicates whether one object on the video display is in front of or behind another object. This enables a video display system to determine whether a given object will be hidden or seen on the display. The Z-buffer generally contains one number for each pixel in the frame buffer. This number is often referred to as the "Z" value and provides an indication of the depth of an object along a Z axis pointing into the plane of the screen. The use of Z values thereby provides a third dimension coordinate and allows for the realization of a three-dimensional view. In the typical video display system, a small Z value indicates that the object is closer to the observer, while a large Z value generally indicates that the object is further away from the observer. Given a plurality of objects corresponding to a given pixel location, objects with a larger Z value will be hidden by objects which have a smaller Z value and are therefore closer to the observer.

In order to present a new image on the display, the frame buffer and Z-buffer must be updated. The conventional approach to updating the frame buffer and Z-buffer generally includes performing a horizontal line-byline raster scan across the video display apparatus. In doing so, a given horizontal scan line has a Y coordinate value and a changing X coordinate value as the image is drawn from one side of the screen to the other. Each pixel location displayed will have an old Z value and an old pixel value stored in the Z-buffer and frame buffer, respectively. For each pixel location, the old Z value in the Z-buffer is read for the current pixel location. For that current pixel location, a new Z value and a new pixel value are computed by the graphics controller. The graphics controller compares the old Z value to the new Z value for the current pixel location to determine if the current pixel is closer to the observer than the pixel already stored in the frame buffer. The new pixel value is then written into the frame buffer for the current pixel location if the new pixel for that location is closer to the observer than the pixel stored in the frame buffer. If the new pixel is hidden, the controller proceeds to the next pixel location, leaving the old pixel value in the frame buffer and the old Z value in the Z-buffer. When the new pixel at a given location is closer to the observer than the old pixel, the controller writes the new Z value for the current pixel location into the Z-buffer. This process is then repeated for the next pixel along the scan line. When clearing in accordance with the prior art, a region of the Z-buffer is generally cleared in order to clear the corresponding region of the screen by writing the largest possible Z value into all locations selected for clearing.

As previously mentioned, the Z-buffer is usually cleared before the Z-buffer may be used to draw the new image. In order to clear a portion of the Z-buffer, the conventional approach typically includes initially determining the pixel locations in the region to be cleared. Then, the conventional graphics update controller will usually write the largest possible Z value into the Z-buffer for all pixel locations for each line to be cleared. However, a number of the prior art systems commonly suffer from a delay in clearing a region of the screen due to the need to clear the corresponding region in the Z-buffer. For example, to clear a Z-buffer which has 1280 by 1024 pixels and is 32 bits deep with a 64 bit memory word accessed at 25 MHz, the above mentioned conventional clearing approach typically requires a clearing time of more than 26 milliseconds just to clear the Z-buffer. This is a relatively large amount of time in a system which is supposed to draw images with "real time" motion capability. Such a clearing time would likely preclude full screen update rates of 30 Hz or faster.

An alternate approach to clearing the Z-buffer is disclosed in U.S. Pat. No. 5,038,297 to Hannah. The above-cited reference is incorporated herein by reference. The approach in Hannah employs a plurality of bits associated with the frame buffer for invalidating the Z values in the Z-buffer, instead of actually clearing the entire Z-values. Each of the invalidating bits consists of one bit of memory storage taken from a word in the frame buffer which is typically implemented with VRAM. Most of the time, the frame buffer is generally used for writing color and intensity for each pixel. By attaching the invalidating bits to the frame buffer, the Hannah approach forces additional reading of the frame buffer to invalidate the Z-buffer which would normally not otherwise be required.

A similar approach which uses invalidating bits is disclosed in U.S. Pat. No. 5,301,263 to Dowdell which is likewise incorporated herein by reference. The Dowdell approach has a Z-value and an invalid bit stored in memory for each Z-buffer address. The invalid bit in Dowdell indicates whether or not a corresponding Z-value memory location has a valid Z-value stored therein. The Dowdell approach further provides a way to quickly update Z-values during a rapid clearing of the graphics screen in which the invalid bits corresponding to the pixels to be cleared would be set to "one". While a quick update may be achieved with the use of invalid bits, the Dowdell reference fails to teach optimal organization of the invalid bits within memory and may require additional memory.

Accordingly, it is one object of the present invention to provide for an improved method and system for clearing or invalidating a region of the Z-buffer with increased speed.

It is a further object of the present invention to provide for an improved method for invalidating a region of Z-buffer in a manner which efficiently organizes a plurality of invalidating bits for invalidating the corresponding values in the Z-buffer and achieves enhanced performance with optimized memory use.

It is also an object of the present invention to achieve a less expensive and more efficient method and system for invalidating a portion of Z-buffer to clear the Z-buffer during updating operations performed with a raster scanned computer controlled video imaging system.

Yet another object of the present invention is to provide for such a method and system for invalidating a region of Z-buffer with organized invalidating bits that may selectively discontinue or continue use of the invalidating bits as desired.

SUMMARY OF THE INVENTION

A method and system are provided for clearing a portion of a Z-buffer in a raster scanned imaging system having an array of pixels, a frame buffer and a graphics controller. The Z-buffer includes an array of Z-buffer elements and each Z-buffer element is associated with a respective pixel. The Z-buffer has page organized random access memory (RAM) including a plurality of memory pages. The method includes establishing a single invalidity bit for each Z-buffer element so that each invalidity bit determines a valid or invalid state for the corresponding Z-buffer element. A plurality of the invalidity bits are organized so that the invalidity bits are located within the same memory page as the corresponding Z-buffer elements. Binary information is written into the plurality of invalidity bits so as to invalidate the corresponding Z-buffers elements to be cleared.

Additionally, binary Z value information is stored in the Z-buffer elements and a predetermined Z value may be substituted for an existing Z value if a corresponding invalidity bit is invalid. Preferably, this predetermined value represents background display information. If a corresponding invalidity bit is set to the invalid state, the Z-value in the corresponding Z-buffer is set to the background display information. Otherwise, with the invalidity bit set to the valid state, the Z-value element is set to a new fetched Z-value. Furthermore, accessing of the invalidity bits may be selectively discontinued so as to limit memory use when desired.

BRIEF DESCRIPTION OF THE DRAWINGS

Other objects and advantages of the present invention will become apparent to those skilled in the art upon reading the following detailed description and upon reference to the drawings in which:

FIG. 6 shows the arrangement of information found on one page of the Z-buffer according to the present invention;

FIG. 7 further shows the arrangement of information on a portion of one page of the Z-buffer shown in FIG. 6;

DETAILED DESCRIPTION OF THE PREFERRED EMBODIMENTS

Figure 1:
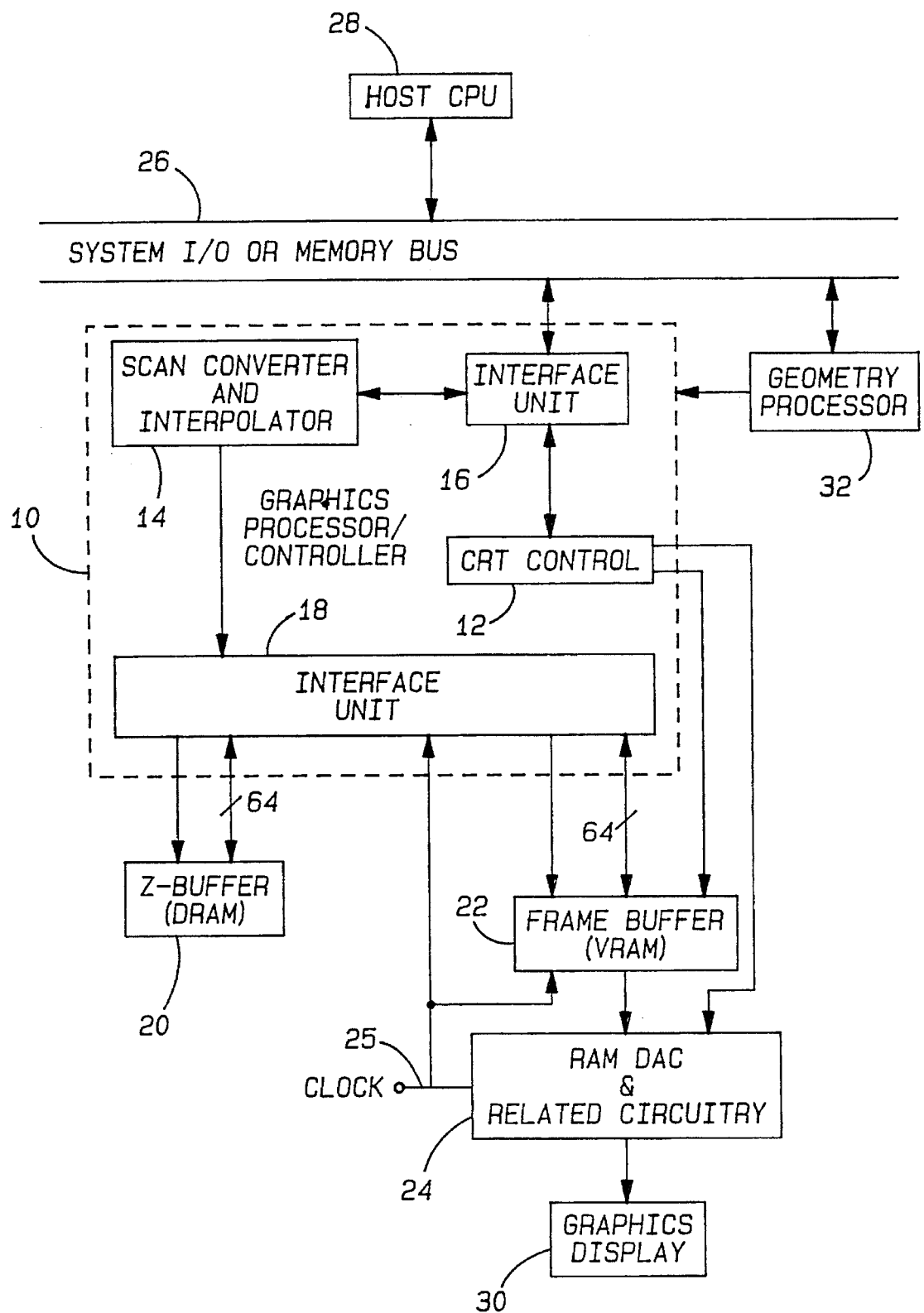
FIG. 1 is a system block diagram illustrating the architecture of a graphics imaging system for use in a computer controlled video display system according to the present invention.

Turning now to FIG. 1, the general architecture of a graphics display system is shown therein for implementing the present invention. The graphics display system includes a graphics processor/controller 10 for controlling the necessary graphics display operations. The graphics processor/controller 10 preferably includes a scan converter and interpolator device 14 and a CRT control device 12. Scan converter and interpolator device 14 includes circuitry for converting higher level graphics primitives such as lines or triangles into pixel operations. The CRT control device 12 controls operation of a display device such as a cathode ray tube (CRT) graphics monitor; however, the control device 12 should conform to the particular graphics display device employed which may include a CRT, liquid crystal or other known graphics display devices. The graphics processor/controller 10 further includes a first interface unit 16 and a second interface unit 18 which allow the graphics processor/controller 10 to interface with other hardware devices as will be described hereinafter.

The graphics processor/controller 10 is preferably coupled to a system input/output or memory bus 26 via first interface unit 16. System input/output or memory bus 26 in turn is operatively coupled to a host central processing unit (CPU) 28. The CPU 28 may include any one of a number of available processing units such as models 486 or Pentium (586) microprocessors, both of which are manufactured and sold by Intel Corporation. CPU 28 and system input/output or memory bus 26 provide memory and processing capability. Furthermore, a geometry processor 32 is coupled to the graphics processor/controller 10 and the system input/output or memory bus 26 for providing optional accelerated geometry processing functions. Such functions may include performing geometric and perspective transformations and 3-D clipping.

The graphics display system includes a Z-buffer 20 coupled to the graphics processor/controller 10 via the second interface unit 18. The Z-buffer 20 is implemented with random access memory (RAM) and preferably includes dynamic random access memory (DRAM). The Z-buffer 20 could alternately be implemented with video RAM (VRAM). Z-buffer 20 stores the Z-values and corresponding invalidity bits which are also referred to herein as Z tags. The graphics display system further includes a frame buffer 22. The frame buffer 22 is similarly coupled to the graphics processor/controller 10 via the second interface unit 18. The frame buffer 22 is also implemented with RAM and preferably includes video random access memory (VRAM). However, it should be understood that frame buffer 22 could alternately be implemented with DRAM. Both Z-buffer 20 and frame buffer 22 are coupled to the second interface unit 18 via a pair of data communication buses, one bus for communicating address and control information and the other bus for handling data information. It should be apparent to one skilled in the art that each of the Z-buffer 20 and frame buffer 22 may be incorporated into one or a plurality of DRAM and VRAM chips. In addition, a plurality of memories may be addressed together as a group and treated as a single memory. Also, the Z-buffer 20 and frame buffer 22 could be implemented in a manner which shares a single memory bus and/or a set of memory chips.

The frame buffer 22 is further coupled to a random access memory digital-to-analog converter (RAM DAC) and related circuitry 24. The RAM DAC 24 is also coupled to the CRT control device 12 for receiving vertical or horizontal blanking and synchronization signals. The RAM DAC 24 has an output connected to a graphics display monitor 30 which may include a cathode ray tube (CRT), a liquid crystal display or other known graphics display devices. Each of the RAM DAC 24, frame buffer 22 and graphics processor/controller 10 further receives a clocking signal via clocking line 25 to insure proper timing of the graphics processing operations.

The graphics display system illustrated herein may be employed as a stand-alone graphics system or integrated into a high performance work station and is preferably capable of providing real time graphics imaging. The graphics processor/controller 10 performs graphics display operations which include updating the Z-buffer 20 and frame buffer 22 for each pixel on the graphics display monitor 30. Graphics control devices such as graphics processor/controller 10 are well known to those in the art. It should also be understood that the host CPU 28 or other remote processing device may alternately be employed to provide some or all of the designated processing operations which are performed by the graphics processor/controller 10.

For each pixel location, the graphics processor/controller 10 generally performs a three-step updating operation that is commonly known to those skilled in the art. According to the first step, the graphics processor/controller 10 reads the old Z value in the Z-buffer 20 for the current pixel location. A new Z value and a new pixel value are computed by the graphics processor/controller 10. Next, the graphics processor/controller 10 compares the old Z value read from the Z-buffer 20 to the new Z value that is calculated for the current pixel location so as to determine if the current pixel value is closer to an observer than the old pixel value stored in the frame buffer 22. Finally, the new pixel value will be written into the frame buffer 22 for the current pixel location if the new pixel for that pixel location is closer to the observer than the pixel already stored in the frame buffer 22. Otherwise, the graphics processor/controller 10 will proceed to the next pixel location to be drawn and repeat the three-step updating operation for the next given pixel location.

The graphics display system according to the present invention preferably employs a double buffering configuration to provide the desired three-dimensional imaging. This configuration requires a frame buffer 22 that switches between a front buffer and a back buffer to show separate images. With a current image stored in the front buffer, the back buffer must be erased by invalidating the Z-buffer via the corresponding invalidity bits. An image may then be drawn onto the back buffer and displayed.

Figure 2:
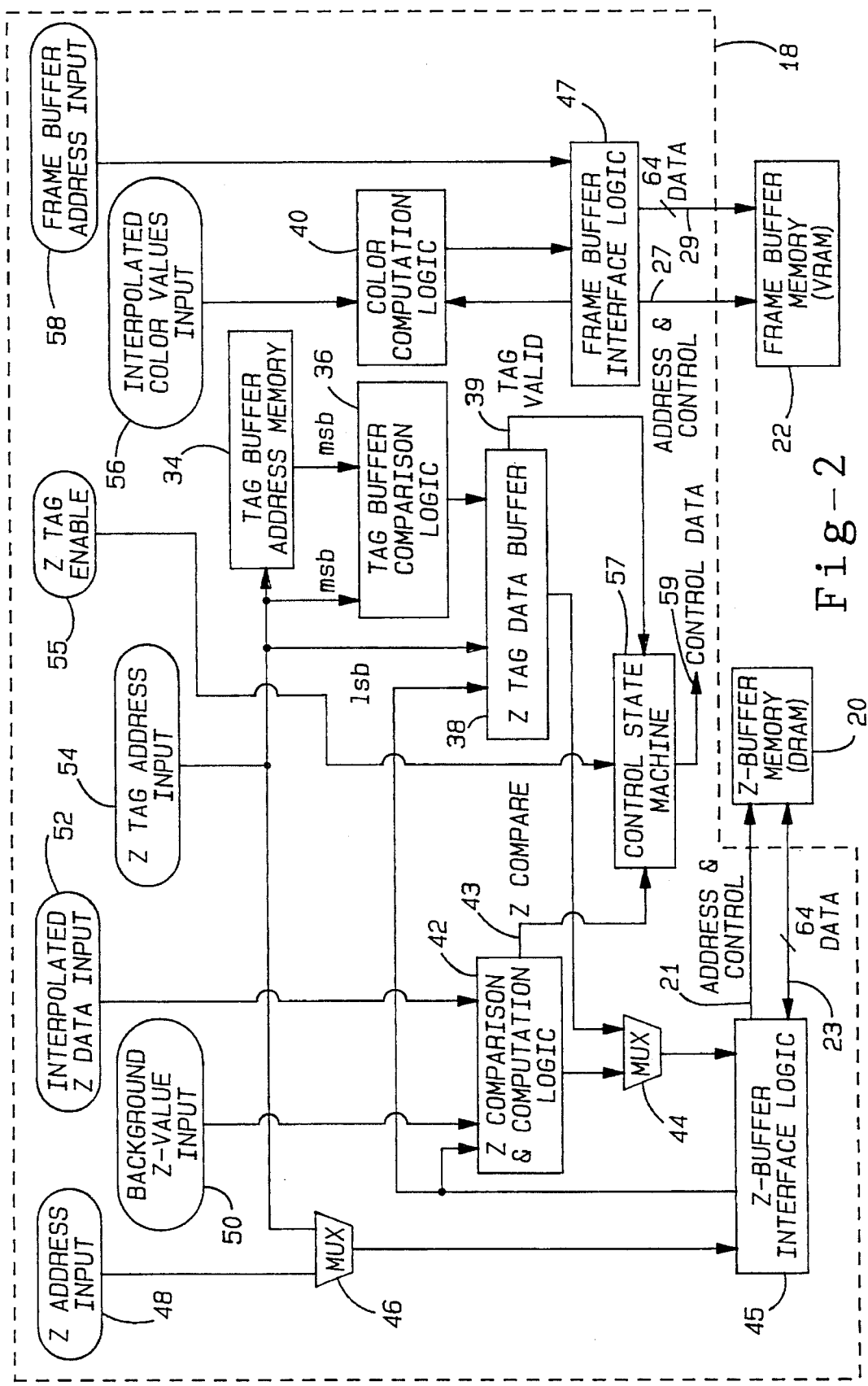
FIG. 2 is a block diagram illustrating the logic configuration of an interface unit used in the graphics processor/controller as shown in FIG. 1.

Referring to FIG. 2, the second interface unit 18 in the graphics processor/controller 10 is shown in more detail coupled to the Z-buffer memory 20 and frame buffer memory 22. The interface unit 18 receives a number of inputs which, for the most part, have been generated by graphics processor/controller 10 or by software in the host CPU 28. These inputs include a Z address input 48, a background Z-value input 50 and an interpolated Z data input 52. Additionally, other inputs include a Z tag address input 54, a Z tag enable input 55, an interpolated color values input 56 and a frame buffer address input 58. These inputs are processed and used to control and feed information to Z-buffer 20 and frame buffer 22.

The interface unit 18 includes a multiplexer (MUX) 46 which receives the Z address input 48 and the Z tag address input 54 and provides an output to Z-buffer interface logic 45. Z comparison and computation logic 42 is also provided which receives as inputs the background Z-value input 50 and the interpolated Z data input 52, as well as an output from the Z-buffer interface logic 45. The Z comparison and computation logic 42 compares the current Z value from the Z-buffer with a new Z value and produces a Z compare output 43 therefrom. The Z compare output 43 is applied to a control state machine 57 to determine whether or not to draw the current pixel.

The interface unit 18 also includes a Z tag data buffer 38. Z tag data buffer 38 has an input connected to an output of tag buffer comparison logic 36. The buffer comparison logic 36 in turn is coupled to a Z tag buffer address memory 34. Z tag buffer address 34 receives the Z tag address input 54 as an input and provides an output to the comparison logic 36. The tag buffer comparison logic 36 compares the output of the tag buffer address memory 34 with the most significant bits of the Z tag address input 54 to determine if the Z tag (i.e., invalidity bit) that is selected is located in the tag buffer 38. In response thereto, comparison logic 36 provides an output to the Z tag data buffer 38. Z tag data buffer 38 compares the output of comparison logic 36 with the Z tag address input 54 and produces a Z tag valid output signal 39 in response thereto. The Z tag valid output signal 39 is applied to control state machine 57 to determine whether the current invalidity bit is valid or invalid.

In addition to receiving Z compare output 43 and tag valid output 39, control state machine 57 also receives the Z tag enable input 55. The Z tag enable input 55 determines whether the Z tag invalidity bit operations are enabled or disabled. This allows a user to disable the Z tag operations by selecting the proper Z tag enable input 55. With Z tag enable input 55 set to "off", Z tag operation disablement may allow for the realization of a higher resolution Z-buffer for a given memory size. This provides a user or system with the ability to dynamically tradeoff resolution for performance. This is particularly advantageous for use in 3-D systems especially for current and future use in the personal computer (PC) industry. Control state machine 57 generates control outputs 59 which include information generated in response to the state machine inputs and which are used in further processing operations.

Interface unit 18 further includes another multiplexer 44 which receives an output from Z comparison and computation logic 42 as well as the output of Z tag data buffer 38. Multiplexer 44 has an output coupled to the Z-buffer interface logic 45. A unidirectional address and control bus 21 is coupled between the Z-buffer interface logic 45 and the Z-buffer memory 20 for providing address and control signals to the Z-buffer memory 20. A 64-bit bi-directional data communication bus 23 is further coupled between the Z-buffer interface logic 45 and the Z-buffer memory 20 for communication data words therebetween.

Also included in the interface unit 18 is color computation logic 40 for receiving the interpolated color values input 56. Color computation logic 40 in turn is coupled to frame buffer interface logic 47 via a pair of opposing unidirectional buses for writing new data to the frame buffer interface logic 47 and writing existing frame buffer data to the color computation logic 40. Frame buffer interface logic 47 further receives the frame buffer address input 58. A unidirectional address and control bus 27 couples the frame buffer interface logic 47 to the frame buffer memory 22 for providing address and control information to the frame buffer memory 22. The frame buffer interface logic 47 and frame buffer memory 22 are further coupled together via a 64 bit bi-directional data communication bus 29 for communicating data words therebetween.

Figure 3:
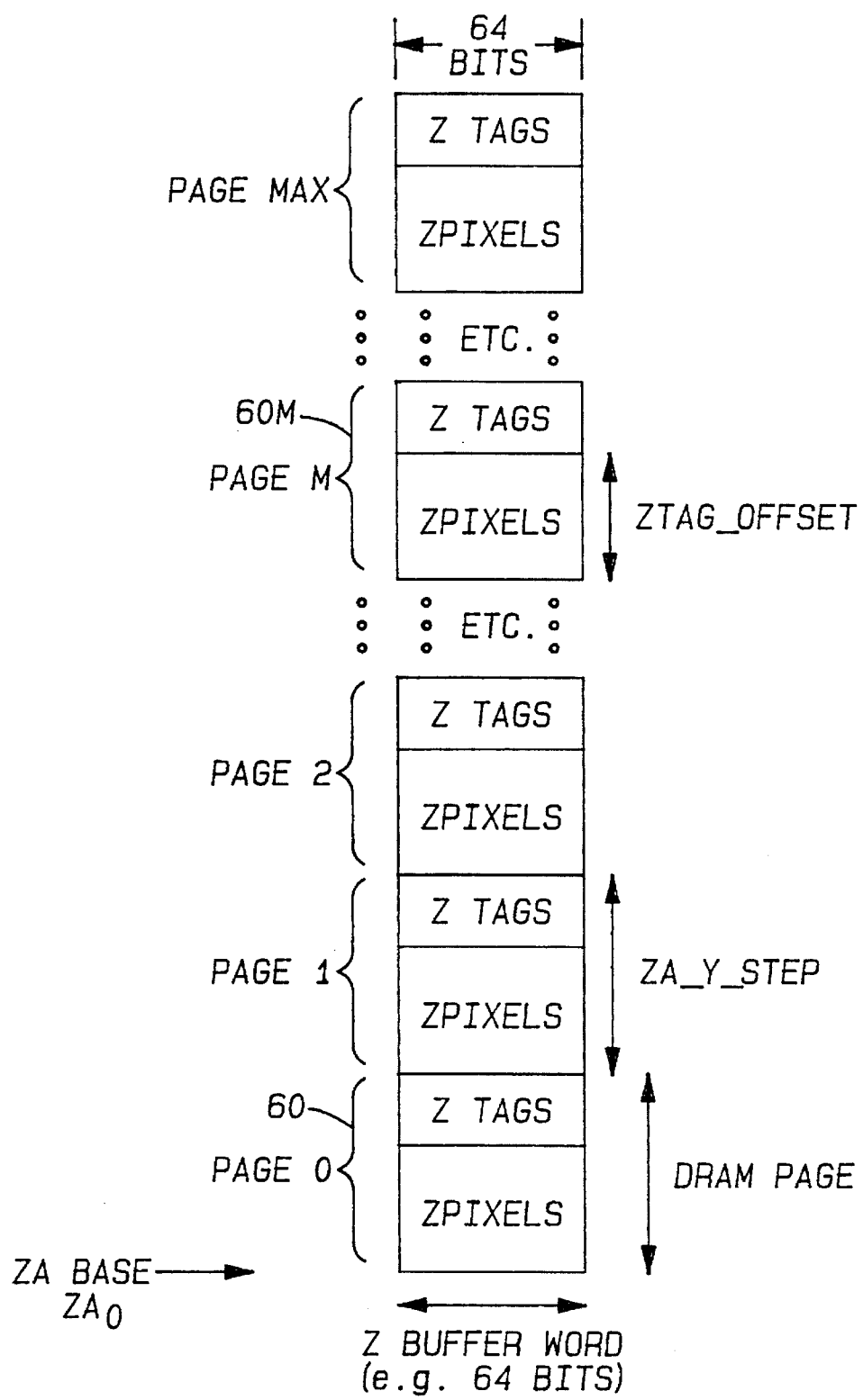
FIG. 3 is a block diagram illustrating the Z-buffer memory and shows the arrangement of information in the Z-buffer according to the present invention.
Figure 4:
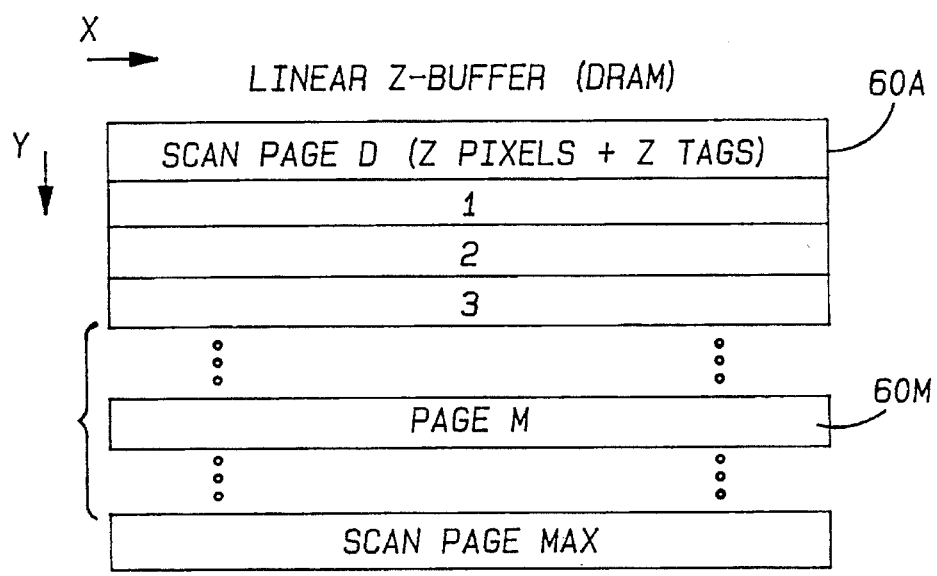
FIG. 4 further shows the arrangement of the Z-buffer implemented in DRAM according to a linear scanning approach.

With particular reference to FIGS. 3 and 4, the arrangement of information stored in the Z-buffer memory 20 is shown in accordance with a linear data structure implemented with page organized DRAM. The Z-buffer memory 20 has a plurality of memory pages 60 which hold binary information stored in a consecutive series of bit locations. The memory pages 60 range from page 0 to page max and provide Z value information stored in Z-buffer memory locations. According to the example illustrated therein, each Z-buffer word includes sixty four bits of binary information and each 64-bit Z-buffer word holds one or more Z-values (typically two to four Z-values), each of which are representative of the depth of an object at a given location. According to the present invention, each page 60 also includes a plurality of invalidity bits referred to herein as Z tags which correspond to the Z values located within the same memory page.

The graphics display system reads and writes information in the DRAM Z-buffer memory 20 according to a conventional raster ordered data structure. DRAM memory is commonly accessed by addressing one page of data at a time and then moving on to address the data within the next page of information. Accordingly, the Z values and corresponding invalidity bits (Z pixels and Z tags) are accessed and scanned for page 0. Once the information found on page zero is completed, the Z pixel and Z tag information found on page 1 is accessed and scanned. This raster scanning sequence continues row-by-row in a linear fashion for the linear data structure.

Figure 5:
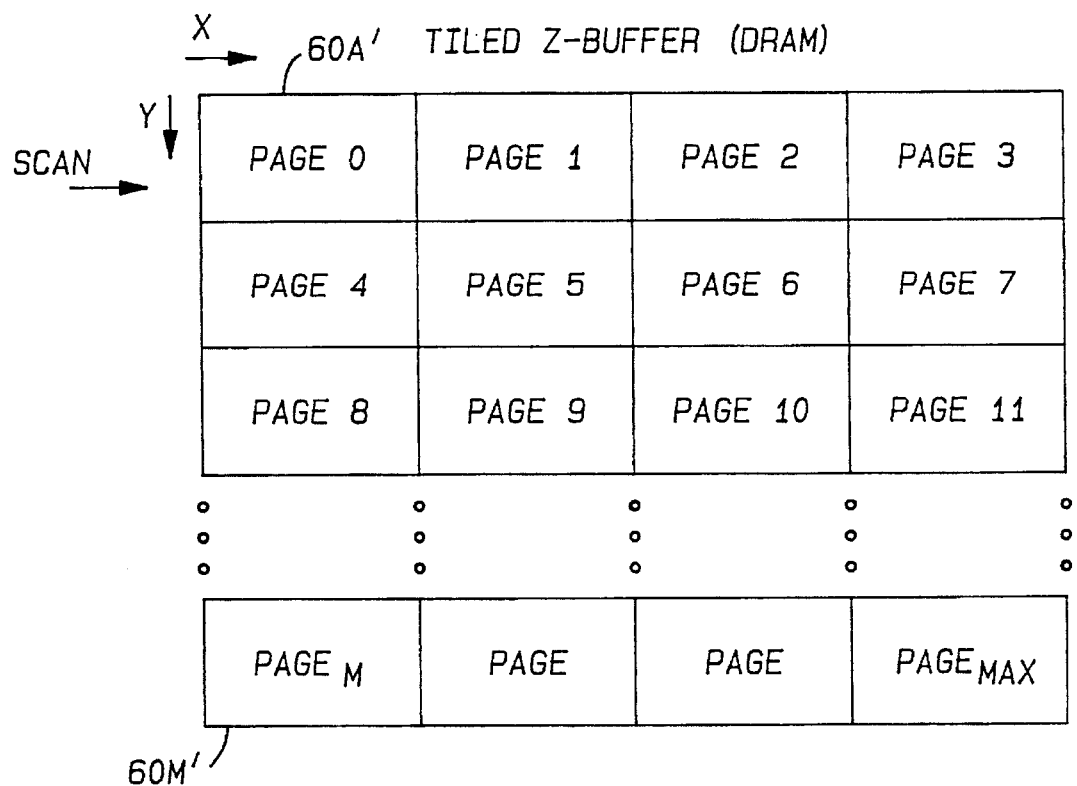
FIG. 5 shows an alternate arrangement of the Z-buffer implemented in DRAM, according to a rectangular tiled scanning approach.

In lieu of the linear Z-buffer data ordering approach, an alternate rectangular tiled data ordering approach may be employed as provided in FIG. 5. According to the rectangular tiled approach, the DRAM memory is accessed by addressing predetermined rectangular portions or blocks of the Z-buffer DRAM. When addressing and scanning of a first rectangular block is completed, the next predetermined rectangular block is addressed and scanned and so on. As shown in FIG. 5, a given scan region may include all or portions of pages 0 through page 3 and then moving on to page 4 through page 7 for the next scan region. The rectangular tiled scanning approach is well known to those skilled in the art and need not be explained in greater detail herein. However, it should be appreciated that each page 60' of information will continue to include Z values corresponding to the portion of the pixel elements being scanned and also includes the invalidity bits (Z tags) which correspond to the Z values found on a given page.

FIG. 6 illustrates the organization of binary information stored within a particular memory page M (60M) of the Z-buffer memory 20. Page 60M includes a series of finite bit locations for storing binary information. The bit locations are grouped into 64-bit words, with four 16-bit locations 62 per each word. Each memory location, such as memory location 62a, is adapted to store a 16-bit Z-value for a corresponding pixel location. According to this arrangement, the first memory region 62a stores a 16-bit Z-value for pixel #1. The 16-bit Z-value provides an indication of the depth of an object in a particular frame for pixel #1. The next memory region 62b stores a 16-bit Z-value corresponding to the next pixel #2. The memory regions 62 for a given page 60 continue to the last pixel location N in a given page M. Accordingly, the last memory region 62n on memory page M likewise is adapted to store a 16-bit Z-value which corresponds to pixel #N.

While 16-bit Z-value storage locations 62 are shown and discussed herein, other size memory locations may be employed without departing from the spirit of the invention. Practically speaking, it may also be desirable to alternately employ 24-bit or 32-bit Z-value storage locations. Furthermore, the graphics imaging system is illustrated and described in connection with a 64-bit data processing configuration and, accordingly, a total of four memory locations 62, each having 16-bit Z-values, make up a 64-bit word. However, various other size words may be employed with the present invention as should become apparent to one in the art.

As previously mentioned, each page 60 of Z-buffer memory 20 further includes a plurality of invalidity bits (Z-tags). The Z-tags are preferably stored together in 64-bit words and each Z-tag includes a single bit of information which determines the validity state of a corresponding Z-buffer location 62. Typically, a Z-buffer location 62 is held in an invalid state if the corresponding Z-tag has a logic "0". Otherwise, the Z-buffer location 62 is held in a valid state if the corresponding Z-tag has a logic "1". However, the logic may be reversed so that a logic "0" provides a valid state and a logic "1" provides an invalid state. The Z-buffer location 62 is generally required to be held in a valid state in order to use the Z-value stored therein.

The organization of the Z-tag information is illustrated in detail in FIG. 7. Each Z-tag word includes 64-bit locations $B_0$ through $B_{63}$. The first Z-tag word 64a has a first bit location $B_0$ for storing an invalidity bit (Z-tag 1) which provide an indication of whether the Z-buffer region 62a for pixel #1 is in a valid or invalid state. Likewise, bit location $B_1$ provides an invalidity bit (Z-tag 2) which indicates whether the next Z-buffer memory region 62b for pixel #2 is in a valid or invalid state. The bit locations $B_3$ through $B_{63}$ are likewise arranged to provide invalidity bits (Z-tag 3 through Z-tag 64) which correspond to the Z-value memory regions which correspond to pixel #3 through pixel #64, respectively. The next or second Z-tag word 64b likewise has 64-bit locations $B_0$ through $B_{63}$ which provide invalidity bits (Z-tag 65 through Z-tag 128) which similarly correspond to Z-value memory regions corresponding to respective pixels 65 through 128 on the corresponding memory page.

The number of Z-tag words 64 included within a given page 60 will depend upon the number of pixel locations which are covered by that particular page. This is because the present invention preferably requires that each Z-value memory region 62 which corresponds to a pixel location for a given page has a corresponding invalidity bit located in the same memory page. Accordingly, the Z-value buffer regions 62 and corresponding invalidity bits will be read and scanned within the same page of memory. This will decrease the amount of time that is necessary to clear the Z-buffer and will enhance the efficiency in clearing the Z-buffer.

The Z pixel and Z tag address computations will now be described in connection with the following illustrative examples provided for a linear scanning approach. Assuming the memory words of the Z buffer 20 are 64-bits wide, the linear (X, Y) addressing of Z pixels and Z tags in the Z buffer 20 can be performed with the following address computations:

$$Zpixel(Address)=ZABase+Y \cdot ZA_{13}\ Y_{13}\ Step+X^*ZA\_X\_Step;$$

$$ZTag(Address)=ZABase+Y^ZA_{13}Y\_Step+ZTag\_Offset+X>>6;$$

$$ZTag(Bit)=X\&0x3F;\ \text{and}$$

$$ZATag\ Base=ZABase+ZTag\_Offset.$$

The Z pixel (address) is dependent upon the variable ZABase which is the origin of the Z buffer in memory and which is required to line up with the starting memory word in the given DRAM page. The ZABase variable is added to the product of the Y coordinate for the given scan line and the word address step ZA__Y__Step which is the change in location between a Z pixel in one scan line and the Z pixel in the next higher scan line. The Zpixel (address) further includes the addition of the product of the X coordinate and the word address step ZA__X__Step which is the change in location between a Z pixel and the Z pixel next to it but with X greater by one pixel.

The Z tag address likewise includes the ZABase added to the product of the Y coordinate and ZA__Y__Step. However, the Z tag address further includes the addition of a Z__Tag__Offset value plus the X coordinate shifted to the right by six bits. The Z__Tag__Offset value is the difference between the start of a Z buffer DRAM page and the start of the Z tag word for the Z tags located on that page. To locate the address for a particular Z tag bit, the X coordinate is logically ANDed with a hex value 3 F. Accordingly, a particular Z tag bit may be located within the Z tag address. The origin of the Z tags in the Z-buffer are further defined by ZATag Base.

The table below summarizes some options and associated parameters that may be employed with the above example. Some numbers in the table could be tweaked so as to increase the number of Zpixels in a given scan line.

| Bytes/Zpixel | Bytes/page | Words/page | Zpixels/page | ZTag__Offset |
|---|---|---|---|---|
| 2 | 4096 | 512 | 1920 | 3840 bytes, 480 words |
| 2 | 8192 | 1024 | 3840 | 7680 bytes, 960 words |
| 4 | 4096 | 512 | 960 | 3840 bytes, 480 words |
| 4 | 8192 | 1024 | 1920 | 7680 bytes, 960 words |

A more specific word address computation may be provided for the Z pixel and Z tag address and the Z tag bit according to the linear scanning approach. Assuming there are 512 memory words in each memory page, 1920 pixels are allocated per scan line (1 memory page) and the Zpixels are 16-bits deep (four Zpixels per word), the Z pixel and Z tag address formulas translate to:

$$Zpixel(Address)=ZABase+Y*512+X*\tfrac{1}{4}=ZABase+Y<<9+X>>2;$$

$$ZTag(Address)=ZABase+Y*512+480+X>>6=ZABase+480+Y<<9+X>>6;$$

$$ZTag(Bit)=X\&0x3F;\ \text{and}$$

$$ZATag\ Base=ZABase+480.$$

The above formulas take into consideration the size of the Z-buffer 20 and number of pixels for the given example. As such, the ZA__Y__Step, ZA__X__Step, and Z tag-offset values may be inserted into the equations and further defined as shown. The above requirements may actually be more restrictive than may be necessary for a given application.

As previously mentioned, the above scheme could be extended to alternate linear Z.-buffer organizations which could be implemented in two other ways. According to one alternate approach, more than one scan line (Y) could be packed into one page. According to the other alternate approach, more than one page could be used for one scan line. These two extensions will generally require additional computation, as shown and described below.

The following discussion of the two extensions is provided for cases which involve factors of two. However, the extensions can be readily extended further to allow for other factors, especially those which are based on powers of two. Also, simplifications can be made to the computations such as shifting rather than multiplying or dividing when powers of two are used. In some cases, a multiplexer (not shown) could be used to select one of two possible offsets rather than requiring multiplies thereof. Incremental computations can also be used to generate the address of a particular pixel given the address of a neighboring pixel.

Extended linear mapping of Z Tags which use multiple scan lines within a single page may be implemented with either of the following two approaches. According to one approach, the Z value data of both scan lines are packed together and Z tags of both scan lines are likewise packed together. This provides for the following address computations:

$$Zpixel(Address)=ZABase+(Y/2)^*ZA\_EvenY\_Step+(Y\&0x1)\ ^*ZA\_OddY\_Step+X^*\ ZA\_X\_Step;$$

$$ZTag(Address)=ZABase+(Y/2)^*ZA\_Y\_Step+(Y\&0x1)\ ^*ZTag\_Odd\_Offset\ +ZTagOffset+X;\ \text{and}$$

$$ZTag(Bit)=X\&0x3F.$$

According to the other approach used for multiple scan lines within a single page, the Z value data and Z tag data are packed together for each scan line. This provides for the realization of the following address computations:

$$Zpixel(Address)=ZABase+(Y/2)^*ZA\_Y\_Step+(Y\&0x1)\ ^*ZA\_OddY\_Step+X^*ZA\_x\_Step;$$

$$ZTag(Address)=ZABase+(Y/2)^*ZA\_Y\_Step+\ (Y\&0x1)^*ZOddTag\_Offset+\ (Y\&0x1)^*(\sim Y\&0x1)^*ZevenTag\_Offset+X>>6;\ \text{and}$$

$$ZTag(Bit)=X\&0x3F.$$

The above equations could be simplified with separate even and odd ZABase and ZATag variables selected by the least significant bit of the Y-coordinate. The mechanism can also be extended in accordance with the second approach to allow multiple pages to be used for a single scan line. The example below supports the use of two pages in one given scan line with some increase in computational complexity.

HalfWidth is ½ the number of Zpixels in a scan line.

if (X< HalfWidth), $$Zpixel(Address)=\ ZABase+(Y^*2)^*ZA\_Y\_Step+X^*\ ZA\_X\_Step;$$

$$ZTag(Address)=ZABase+(Y^*2)^*ZA\_Y\_Step+ZTag\_\ Offset+X>>6;$$

else, $$Zpixel(Address)=ZABase+(Y^*2+1)^*ZA\_Y\_Step+X^*\ ZA\_X\_Step;$$

$$ZTag(Address)=ZABase+(Y^*2)^*ZA\_Y\_Step+ZTag\_\ Offset+(X-HalfWidth)>>6;\ \text{and}$$

$$ZTag(Bit)=X\&0x3F\ \text{(if HalfWidth is a multiple of the number of}$$

bits in a Z buffer word).

For the simplest implementation, incremental calculations should be performed when scan conversion is performed. Examples of incremental calculations are provided as follows:

newZpixel(Address)+=ZA_X_Step //X Step; and newZpixel(Address)+=ZA_Y_Step //Y Step.

Furthermore, the Z tag address should be computed as a bit address and the six least significant bits (lsb's) should be truncated when memory address is needed. This provides an alternative to a six bit up/down counter to indicate whether to increment the word address or not. The use of a counter is certainly a possibility for implementation, but additional control logic may be required. The Z Tag address computations may be provided as follows:

newZTag(Address)+=X //X Step; and newZTag(Address)+=ZA_Y_Step//Y Step.

The above-described techniques in accordance with the alternate embodiments of the present invention could likewise be modified to accommodate a rectangular tiled memory organization. This may be accomplished by considering the rectangular tiled approach previously described in connection with FIG. 5.

Figure 8:
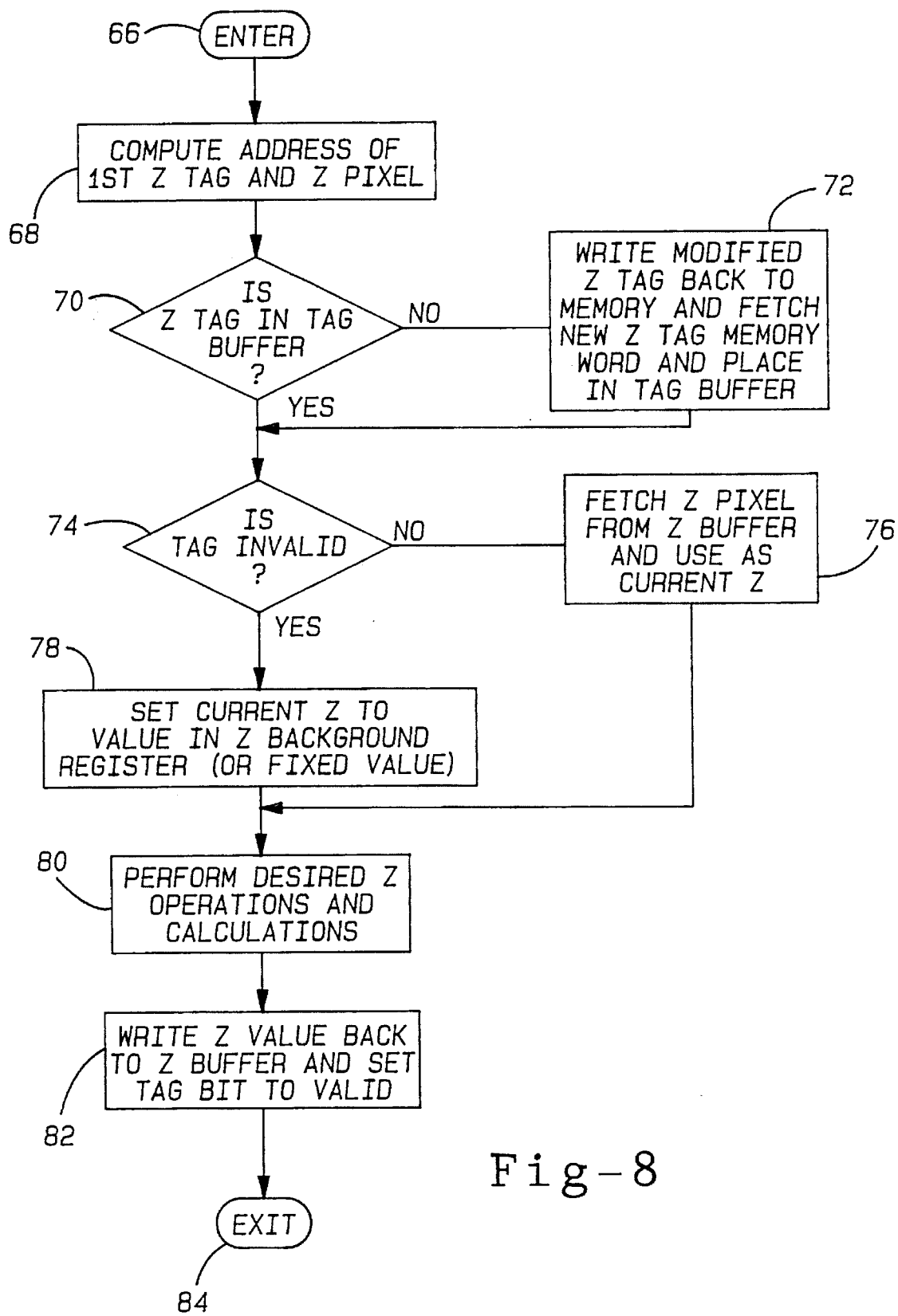
FIG. 8 is a flow diagram illustrating the Z-buffer updating and clearing operations according to the present invention.

The operation of the graphics imaging system for updating and clearing portions of a Z-buffer will now be described in connection with FIGS. 8 and 9. According to FIG. 8, the program is entered at step 66 and proceeds to step 68 which computes the address of the first Z-tag and the Z pixel. Test block 70 then checks to see if the Z-tag is in the tag buffer. If not, step 72 writes a modified Z-tag back to memory and fetches the new Z-tag memory word and places the new Z-tag memory word in the tag buffer. If the Z-tag is in the tag buffer, test block 74 will check to see if the Z tag is invalid. If the Z tag is not invalid, step 76 will fetch the Z pixel from the Z-buffer and use as the current Z-value and proceed to step 80. If the tag is invalid, step 78 will set the current Z-value to the value in the Z background register or some fixed value.

Next, step 80 will perform predetermined Z operations and calculations for updating a portion of the Z-buffer. These Z operations and calculations typically will include reading and comparing the current Z-value with an interpolated Z-value. Additionally, if the interpolated Z-value is less than the current Z-value, the interpolated Z-value is loaded into the Z-buffer. Otherwise, the current Z-value which is closer is loaded into the Z-buffer. Thereafter, step 82 will write the Z-value back to the Z-buffer and set the Z tag bit to valid and then exit the program via step 84.

Figure 9:
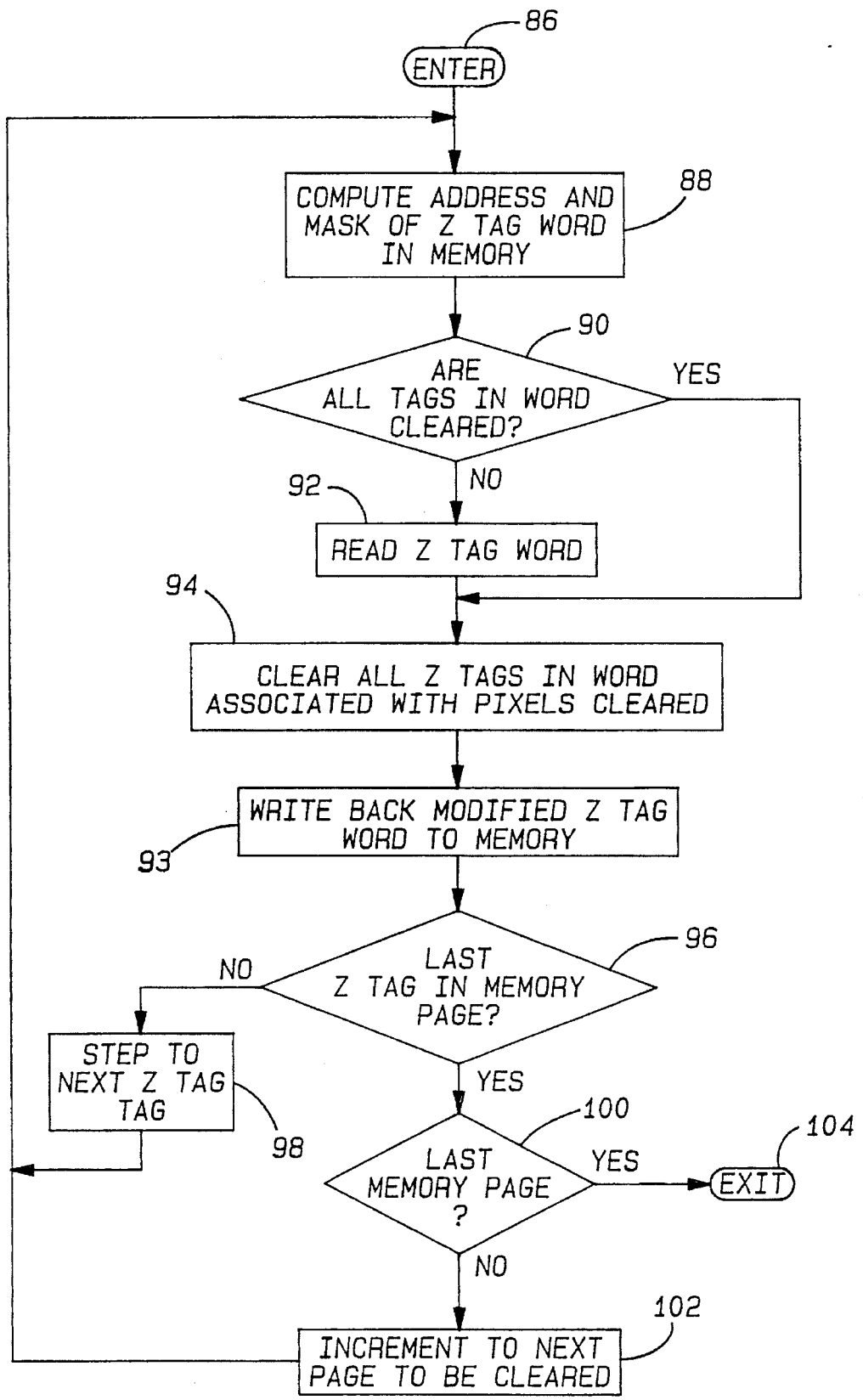
FIG. 9 is a flow diagram further illustrating the Z-buffer clearing operations according to the present invention.

Referring particularly to FIG. 9, the program will enter step 86 and compute the address and mask of the Z-tag word in memory according to step 88. Test block 90 will check to see if all Z tags in the Z-tag word are cleared. If all tags are cleared, the program will proceed to step 94. If all tags are not cleared, step 92 will read the Z-tag word and proceed to step 94. Next, step 94 will clear all Z-tags in the word associated with the pixels being cleared. Step 93 will then write back the modified Z tag word to memory. Thereafter, test block 96 will look for the last Z-tag in a memory page. If the last Z-tag in a memory page is detected, proceed to step 98 which will step to the next Z-tag and then return to the beginning of the program. If the last Z-tag in memory page is detected, test block 100 will look to see if this is the last memory page. If the last memory page is detected, the program will proceed to exit step 104. If the last memory page is not detected, proceed to step 102 to increment to the next page to be cleared and then return to the beginning of the program.

The present invention advantageously provides for a fast clearing of the Z-buffer 20 and achieves enhanced performance for the overall graphics display system. For example, a conventional graphics display system with a frame buffer equipped to handle 1280 by 1024 pixels and a writing speed of 40 nanoseconds per 64-bit word may require clearing each word in the Z-buffer 20. According to the conventional approach, this would require a Z-buffer clearing time of about 13.1 milliseconds for 16-bit words and about 26.2 milliseconds for 32-bit words. With the use of the invalidity bits according to the present invention, only the Z tags need to be cleared in order to clear the Z-buffer and this would require a clearing time of approximately 0.82 milliseconds according to this example. Accordingly, the present invention provides for a much faster clearing time while also providing for the efficient organization of the Z tags in the Z-buffer 20.

The graphics imaging system described herein in connection with the present invention advantageously allows for the achievement of a high speed clearing of the Z-buffer which optimizes memory use in an efficient manner. This is particularly beneficial for use in updating portions of a Z-buffer, especially where high speed frame rates are required. Accordingly, Z-buffer clearing is accelerated to realize enhanced drawing performance while minimizing the amount of memory and memory bandwidth that is required. While particular examples are describes herein, it should be appreciated that such examples are not limiting. For example, different size Z-buffer locations and Z-tag words may be used.

While this invention has been disclosed in connection with a particular example thereof, no limitation is intended thereby except as defined in the following claims. This is because a skilled practitioner recognizes that other modifications can be made without departing from the spirit of this invention after studying the specification and drawings.

What is claimed is:

1. A method for clearing a portion of a Z-buffer in an imaging system which has an array of pixels, a frame buffer, and a graphics controller, said Z-buffer having page organized random access memory (RAM) with a plurality of memory pages and including an array of Z-buffer elements, and each Z-buffer element being associated with a respective pixel, said method comprising:

storing Z value information in each of said Z-buffer elements;

establishing a plurality of invalidity bits, each of said invalidity bits determining a valid or invalid state for a corresponding Z-buffer element;

organizing the plurality of said invalidity bits so that each of said invalidity bits is located on the same page as the corresponding Z-buffer element, and wherein a plurality of invalidity bits are grouped within a data word; and writing binary information into a portion of the plurality of invalidity bits so as to invalidate the Z-buffer elements for the portion of the Z-buffer to be cleared.

2. The method as defined in claim 1 further comprising the step of scanning a row of data from a page organized dynamic RAM (DRAM) for each page of said Z-buffer.

3. The method as defined in claim 1 further comprising the step of scanning a block of data from a page organized dynamic RAM (DRAM) for each page of said Z-buffer.

4. The method as defined in claim 1 further comprising the steps of:

substituting a predetermined Z value for an existing Z-value found in the Z-buffer if a corresponding invalidity bit is invalid.

5. The method as defined in claim 4 wherein said predetermined value represents background display information.

6. The method as defined in claim 1 further comprising the step of selectively discontinuing accessing of invalidity bits.

7. The method as defined in claim 1 further comprising the step of reading invalidity bits on a given page of memory prior to reading Z values for the corresponding pixels.

8. A method for clearing a portion of a Z-buffer in a raster scanned imaging system which has an array of pixels, a frame buffer, and a graphics controller, said Z-buffer having page organized random access memory (RAM) with a plurality of memory pages, each memory page including Z-buffer elements with each element being associated with a respective pixel, said method comprising:

storing a first plurality of bits of information in each of the Z-buffer elements, said first plurality of bits of information representing Z-values for corresponding Z-buffer elements;

establishing a plurality of invalidity bits, each of said invalidity bits corresponding to one of the Z-buffer elements so that each of said invalidity bits determines a valid or invalid state for a corresponding Z-buffer element;

organizing the plurality of invalidity bits so that each of said invalidity bits is located on the same page as the corresponding Z-buffer element, and wherein a plurality of invalidity bits are grouped within one or more a data words;

writing binary information into a portion of the plurality of invalidity bits so as to invalidate the Z-buffer elements for the portion of the Z-buffer to be cleared; and substituting a predetermined Z value for the existing Z-value found in the Z-buffer if a corresponding invalidity bit is invalid.

9. The method as defined in claim 8 wherein said predetermined value represents background display information.

10. The method as defined in claim 8 further comprising the step of selectively discontinuing accessing of invalidity bits.

11. A method for establishing and organizing a plurality of invalidity bits for use in clearing a portion of a Z-buffer memory having random access memory (RAM), said method comprising:

providing a plurality of memory pages of said Z-buffer, each page including Z-buffer elements for storing Z values for corresponding pixels;

establishing a plurality of invalidity bits, each of said invalidity bits determining a valid or invalid state for a corresponding Z-buffer element;

writing binary information into each of said invalidity bits;

organizing said invalidity bits so that each of said invalidity bits and the corresponding Z-buffer elements are located on the same page, wherein a plurality of said invalidity bits are stored together as a group in one or more data words which are separate from the Z buffer elements and read prior to reading Z values for the corresponding pixels; and checking said invalidity bits and substituting a predetermined Z value for an existing Z value found in the Z-buffer if a corresponding invalidity bit is invalid.

12. The method as claimed in claim 11 wherein said predetermined value represents background information.

13. The method as defined in claim 11 further comprising the step of selectively discontinuing accessing of invalidity bits.

14. The method as defined in claim 11 wherein said page organized RAM (RAM) comprises dynamic RAM (DRAM).

15. A system for clearing a portion of a Z-buffer in an imaging device, said system comprising:

an array of pixels;

a frame buffer;

a graphics controller;

a Z-buffer having page organized random access memory (RAM) with a plurality of memory pages, each memory page having a plurality of Z-buffer elements which are adapted to store Z values for a set of corresponding pixels; and a single invalidity bit established for each Z-buffer element so that each invalidity bit determines a valid or invalid state for a corresponding Z-buffer element, each of said invalidity bits being located on the same page as the corresponding Z-buffer elements so that the corresponding Z-buffers elements are validated or invalidated in response to the invalidity bits scanned on the same memory page, and wherein a plurality of the invalidity bits are grouped together in memory within a data word.

16. The system as defined in claim 15 wherein said Z-buffer comprises dynamic RAM (DRAM).

17. The system as defined in claim 15 further comprising means for selectively discontinuing access of said invalidity bits.

18. A system as defined in claim 15 wherein said invalidity bits are read before reading the Z values for the corresponding pixels.

19. A method for clearing at least a portion of a Z-buffer in an imaging system which has an array of pixels, a frame buffer and a graphics controller, said Z-buffer having page organized random access memory (RAM) which contains a plurality of memory pages, each memory page having an array of Z-buffer elements which are associated with respective pixels, said method comprising:

storing Z value information in the Z-buffer elements;

establishing a plurality of validation bits, each of said validation bits determining a valid or invalid state for a corresponding Z-buffer element;

organizing the plurality of validation bits so that each of said validation bits is located on the same page as the corresponding Z-buffer element, said validation bits being grouped within one or more data words; and reading the Z value information and validation bits.

20. The method as defined in claim 19 wherein the step of reading further comprises reading validation bits prior to reading the Z value information for corresponding pixels.

* * * * *